United States Patent
Abe et al.

(10) Patent No.: US 9,053,745 B2
(45) Date of Patent: Jun. 9, 2015

(54) METHOD FOR WRITING FILE ON TAPE MEDIUM THAT CAN BE READ AT HIGH SPEED

(71) Applicant: International Business Machines Corporation, Armonk, NY (US)

(72) Inventors: Atsushi Abe, Tokyo (JP); Setsuko Masuda, Tokyo (JP); Yumiko Ohta, Tokyo (JP); Terue Watanabe, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/459,429

(22) Filed: Aug. 14, 2014

(65) Prior Publication Data

US 2015/0055241 A1      Feb. 26, 2015

(30) Foreign Application Priority Data

Aug. 20, 2013   (JP) .................................. 2013-170070

(51) Int. Cl.
  *G11B 19/02*   (2006.01)
  *G11B 5/09*    (2006.01)
  *G06F 13/00*   (2006.01)
  *G11B 20/12*   (2006.01)

(52) U.S. Cl.
  CPC .................. *G11B 20/1201* (2013.01)

(58) Field of Classification Search
  CPC .. G11B 20/00086; G11B 15/04; G11B 15/43; G11B 15/48; G11B 2220/90; G11B 27/107; G11B 27/3027; G11B 5/012; G11B 5/5504; G11B 5/5508; G06F 3/0601; G06F 3/0686
  USPC ............ 360/60, 72.2, 69, 71, 124, 134, 72.1, 360/78.02, 73.04, 92.1, 72.3, 130.31; 711/11, 112, 103, 162, 134, 111
  See application file for complete search history.

(56) References Cited

U.S. PATENT DOCUMENTS

| | | | |
|---|---|---|---|
| 7,925,879 B2 | 4/2011 | Yasaki et al. | |
| 8,665,563 B2 * | 3/2014 | Hostetter | ...................... 360/134 |
| 2013/0326134 A1 * | 12/2013 | Carter et al. | ................... 711/111 |

FOREIGN PATENT DOCUMENTS

| | | |
|---|---|---|
| JP | 2007-286679 A | 11/2007 |
| JP | 2008-293189 A | 12/2008 |

* cited by examiner

*Primary Examiner* — Nabil Hindi
(74) *Attorney, Agent, or Firm* — Francis Lammes; Stephen J. Walder, Jr.; Randall J. Bluestone (57) ABSTRACT

Mechanisms for writing a file on a tape medium in a manner that enables high-speed reading are provided. A predetermined format is applied to the medium that divides the medium into a first region of a predetermined length in a longitudinal direction from a region of the medium, and a second region that extends from an end of the first region to a terminal region of the medium in a longitudinal direction and that has a predetermined width with respect to a width of the medium in a transverse direction. Writing a top data portion of a predetermined data amount of the data of the file in the first region and writing data of the file in the second region are performed.

17 Claims, 5 Drawing Sheets

CASE WHERE TAPE IS INITIALIZED WITH LTFS FORMAT

FIG. 3B

CASE WHERE FILE 1 IS WRITTEN AFTER STATE IN (A)

FIG. 3C

CASE WHERE FILE 2 IS WRITTEN ON IP BY RULES FUNCTION AFTER STATE IN (B)

METHOD FOR WRITING FILE ON TAPE MEDIUM THAT CAN BE READ AT HIGH SPEED

BACKGROUND

The present invention relates to a method for writing data of a file on a tape medium (or magnetic tape unit) so that the data can be accessed at high speed. More particularly, the present invention relates to a writing method that enables high speed reading of data on an index partition of a linear tape file system (LTFS).

The LTFS is a file system that realizes direct access to a fifth generation linear tape open (LTO), i.e. LTO-5, tape drive and an enterprise tape drive (e.g., IBM TS1140), as well as a tape library that uses these tape drives. According to the LTFS format, an LTO partition function is utilized to divide a tape (also referred to as a tape medium, a medium, a tape cartridge, or simply a tape herein) into two partitions. The two partitions are an index partition (IP) which is a region in which metadata is written, and a data partition (DP) which is a region in which the data body is written. The LTFS is a method that utilizes a tape medium, via a file system, as if the tape medium were a hard disk drive (HDD) or a Universal Serial Bus (USB) memory. The LTFS stores the body of a file on the DP of the tape medium, and stores metadata relating to the file, referred to as an "index", in the XML file format on the IP.

Figure 1:
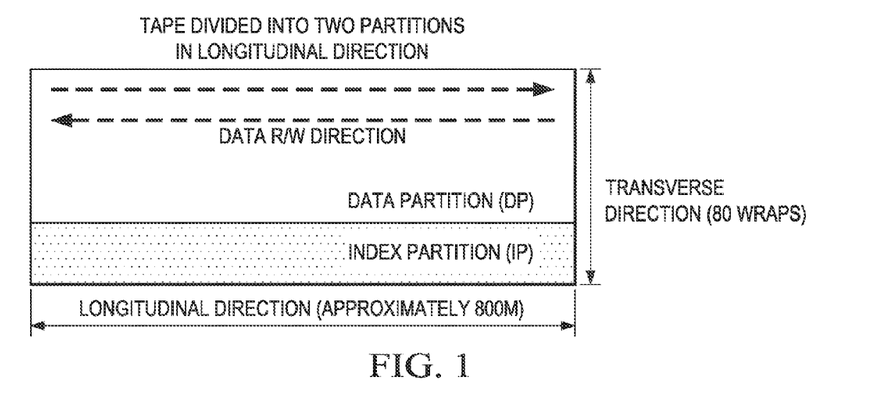
FIG. 1 is a diagram illustrating a tape medium that is divided into two partitions according to the conventional linear tape file system (LTFS)

FIG. 1 illustrates a tape medium that has been divided into two partitions according to the conventional LTFS. An LTO-5 tape drive writes data while causing a write head to make a round trip over wraps of a write region along the longitudinal direction of the tape medium. The LTFS utilizes two of the wraps (amount of one round trip) as an index partition. The tape medium is divided into two partitions that are used as the IP and the DP from a beginning of tape (BOT) to an end of tape (EOT). A wrap is equivalent to a track. A tape cartridge according to LTO-5 has a length of approximately 800 m in the longitudinal direction of the tape medium, and has a width of 80 wraps in the transverse direction. The IP and the DP are divided by a guard band composed of two wraps. The tape medium travels backward and forward in the longitudinal direction of the wraps. A situation where the travelling direction thereof is inverted at the BOT or the EOT is referred to as a "wrap turn". It is possible to change the number of partitions to an arbitrary number that is greater than or equal to three in accordance with various specifications.

In some cases, in addition to metadata, user data of a specific format and size specified by the user is also written on the IP. This is referred to as a "rules function", and is a function created with the expectation that access to specified data would be speeded up by writing the data in the particular area that is designated the IP. However, the following problems exist with regard to this function.

A first problem is that access to target data is not faster even when the rules function is used. The IP and DP are divided along the longitudinal direction of the tape. Consequently, even in the case of data written on the IP, a seek occurs in the longitudinal direction, similar to the case of data being written to the DP and being accessed from the DP. Since the time taken to access data depends on the seek time, it is not necessarily the case that an access will be faster even when data is written on the IP.

A second problem that is encountered is that mounting of the tape medium takes time if the rules function is used often. The LTFS is configured as a mechanism that reads metadata written in the IP for storage in a main memory at the time that a tape medium is mounted. Consequently, mounting processing does not end until reading of all metadata finishes. According to the LTFS format, metadata is written at the end of the index partition. In a case where a large amount of data is written to the IP by means of the rules function, a long seek time is required to reach the metadata, and consequently the time until mounting is completed lengthens.

The documents JP2007-286679A and JP2008-293189A describe storage systems in which one portion of a file is stored in a cache (primary storage) and the remaining portion is stored on a HDD (secondary storage).

However, the technology disclosed in the aforementioned documents does not enjoy the advantage of portability that is obtained by holding all the data of one file on a single tape cartridge.

SUMMARY

It would be beneficial to have a mechanism that solves the problem with respect to the rules function of the conventional LTFS and accesses data stored in an IP in a short time. Therefore, an object of the present invention is to provide a method, a tape drive, and a program for writing data of a file on a tape medium in a manner that enables high-speed access (reading).

To achieve the aforementioned object, the illustrative embodiments of the present invention provide a method for writing data of a file on a medium in a tape drive in a manner that enables high-speed reading of the file that is stored. The writing method comprises applying a predetermined format to the medium that divides the medium into a first region of a predetermined length in a longitudinal direction from a region of the medium, and a second region that extends from an end of the first region to a terminal region of the medium in a longitudinal direction and that has a predetermined width with respect to a width of the medium in a transverse direction. The method further comprises writing a top data portion of a predetermined data amount of the data of the file in the first region, and writing data of the file in the second region.

In addition, in the writing method, the predetermined format includes an index partition (IP) that stores an index (metadata) of the file and a data partition (DP) that stores data of the file. The IP includes the first region (IP1) and the second region (IP2), and is divided into these regions. All data of the file is written on the DP. The top data portion of the predetermined data amount of the file is written on the IP1. All data of the file is written on the IP2. The index includes metadata of the file stored in the DP, the IP1, and the IP2. The metadata includes positional information of the data stored in the DP, the IP1, and the IP2, respectively.

Further, the writing method is characterized in that the predetermined data amount is determined according to a movement time from a position of the top data portion stored in the IP1 to a position of residual data (a data portion following the top data portion) of all data of the file stored in the IP2 portion when reading the file. The writing method is also characterized in that the predetermined length is determined so that the top data portion of the predetermined data amount stored in the IP1 and the following residual data portion stored in the IP2 can be read without interruption. Furthermore, the writing method is characterized in that the predetermined length is determined with a maximum seek time from the IP1 to the IP2 on a basis that all the data stored in the IP2 is positioned at a terminal region of the medium.

Further, to achieve the aforementioned object, the illustrative embodiments of the present invention provide a method for reading data of a file that is written by a method described above on a medium in a tape drive. The reading method comprises, in a case where a request to read the file is received, identifying a current position of a read-write head in a longitudinal direction of the medium, determining whether the current position of the head is closer to a position of the top data portion that is stored on the first region that records the file or a position of the data stored on the second region, and moving (locating) the determined position of the head to the data position that is closer thereto, and starting reading from the data. Further, the reading method of the illustrative embodiments of the present invention is characterized in that, in a case of determining the current position of the read-write head above, immediately after mounting the medium, the current position of the read-write head is determined as being close to the position of the top data of the IP1.

In addition, the reading method of the illustrative embodiments of the present invention is characterized in that, in the reading operation above, if the current position of the head is close to the position of the IP1, based on positional information for each data included in the index, the head is moved to the position of the top data and moved to the position of residual data among the data of the IP2 that follows the top data portion and reads the data. Further, the reading method of the illustrative embodiments of the present invention is characterized in that, in the reading operation above, if the current position of the head is close to the position of the IP2, the head is moved to the position of all data on the IP2 and reads the data.

In addition, to achieve the aforementioned object, the illustrative embodiments of the present invention provide a tape drive that writes data of a file on a medium in a manner that enables high-speed reading of the file that is stored. Write control of the drive executes an application of a predetermined format to the medium that divides the medium into a first region of a predetermined length in a longitudinal direction, and a second region that extends from an end of the first region to a terminal region of the medium in a longitudinal direction and that has a predetermined width with respect to a width of the medium in a transverse direction. The write control of the drive further executes writing of a top data portion of a predetermined data amount of the data of the file in the first region, and writing of data of the file in the second region.

Furthermore, to achieve the aforementioned object, the illustrative embodiments of the present invention provide a tape drive that reads data of a file that is written on a medium by a method described above. Read control of the tape drive executes, in a case where a request to read the file is received, identification of a current position of a read-write head in a longitudinal direction of the medium, a determination as to whether the current position of the head is closer to a position of the top data portion that is stored on the first region that records the file or a position of the data stored on the second region, and movement (location) of the determined position of the head to the data position that is closer thereto, and starting of reading from the data.

In addition, to achieve the aforementioned object, the illustrative embodiments of the present invention provide a computer program product for a tape drive that writes data of a file on a medium in a manner that enables high-speed reading of the file that is stored. The computer program product causes the tape drive to execute an application of a predetermined format to the medium that divides the medium into a first region of a predetermined length in a longitudinal direction, and a second region that extends from an end of the first region to a terminal region of the medium in a longitudinal direction and that has a predetermined width with respect to a width of the medium in a transverse direction. The computer program product further causes the tape driver to execute writing of a top data portion of a predetermined data amount of the data of the file in the first region, and writing of data of the file in the second region.

Furthermore, to achieve the aforementioned object, the illustrative embodiments of the present invention provide a computer program product for a tape drive that reads data of a file that is written on a medium by a method described above. The computer program product causes the tape drive to execute, in a case where a request to read the file is received, identification of a current position of a read-write head in a longitudinal direction of the medium, a determination as to whether the current position of the head is closer to a position of the top data portion that is stored on the first region that records the file or a position of the data stored on the second region, and movement (location) of the determined position of the head to the data position that is closer thereto, and starting of reading from the data.

By applying the present invention that is described above, a tape drive can start to read a file in a short time from a top portion of data of the file. Further, according to the tape drive of the present invention, after starting to read a file for presenting a playback of video, reading can be continued without playback of a video being interrupted.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Hereunder, example illustrative embodiments of a method, apparatus, and computer program product for writing data to an IP of a file system in a manner that enables high-speed reading as well as a method for reading the data are described. According to one illustrative embodiment, the IP is divided for use for different purposes into a partition (IP1) that is formed in a transverse direction in which a seek time is less, and a partition (IP2) that is formed in a longitudinal direction in which there are fewer wrap turns in a running direction of a tape. Access to data on the IP is speeded up by splitting and writing data in a manner that makes use of the advantages of the respective partitions (see FIG. 3A-3C described hereafter).

Figure 2:
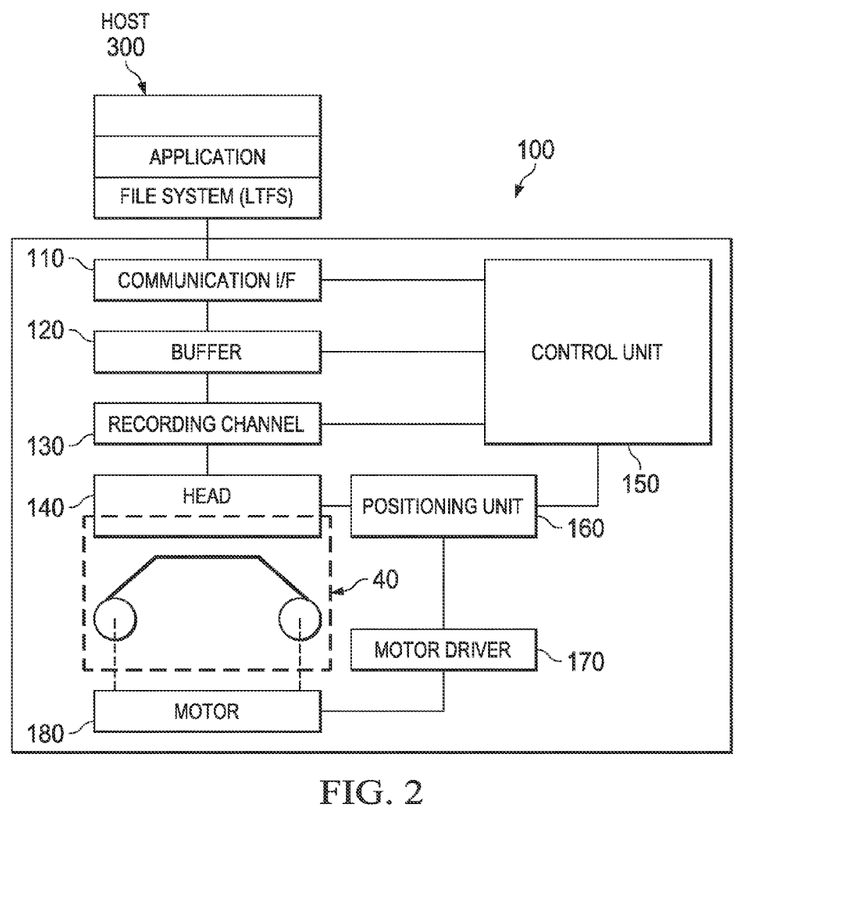
FIG. 2 is a diagram illustrating an example of a hardware configuration of a tape drive (tape storage device) to which an illustrative embodiment of the present invention is applied.

FIG. 2 is a diagram illustrating one example of the hardware configuration of a tape drive (magnetic tape unit) to which one illustrative embodiment of the present invention is applied. A tape drive 100 in FIG. 2 includes a communication interface (I/F) 110, a buffer 120, a recording channel 130, a read-write head 140, a control unit 150, a positioning unit 160, a motor driver 170, and a motor 180. The interface 110 communicates with a host 300 through a network. For example, the interface 110 receives from the host 300 a write command that is an instruction to write data onto a tape cartridge (tape medium or tape) 40. In addition, the interface 110 receives from the host 300 a read command that is an instruction to read data from the tape cartridge or medium 40. The interface 110 has a function that performs compression of write data and decompression of read data, and increases the actual storage capacity for data on a tape medium by approximately double.

The tape drive 100 reads and writes data to the tape medium 40 in data set (referred to as "DS") units that are constructed of a plurality of records that are sent from the host 300. The typical size of a DS is 4 MB. At the host 300, the file system specifies a file or a SCSI command specifies a record, and the host 300 sends a write/read request to the tape drive 100.

A DS is constructed of a plurality of records. Each DS includes management information relating to the data set. User data is managed in record units. The management information is included in a data set information table (DSIT). The DSIT includes the number of records and number of Filemarks (FMs) included in the relevant DS, and also the cumulative number of records and cumulative number of FMs that were written from the top of the tape medium.

The buffer 120 is a memory that temporarily accumulates data to be written to the tape medium 40 or data that was read from the tape medium 40. For example, the buffer 120 is constituted by a dynamic random access memory (DRAM). The recording channel 130 is a communication pathway used for writing data accumulated in the buffer 120 to the tape medium 40, or for temporarily accumulating data read from the tape medium 40 in the buffer 120.

The read-write head 140 has a data read-write element, and performs writing of data to the tape medium 40 and reading of data from the tape medium 40. The read-write head 140 according to one illustrative embodiment of the present embodiment has a servo read element and reads a signal from a servo track provided in the tape medium 40. The positioning unit 160 specifies movement of the read-write head 140 in a short-side direction (width direction) of the tape cartridge 40. The motor driver 170 drives the motor 180.

The tape drive 100 writes data to a tape medium 40 or reads data from a tape medium 40 in accordance with a command received from the host 300. The tape drive 100 includes a buffer, a read/write channel, a head, a motor, a reel on which a tape medium is wound, a read-write controller, a head position control system, and a motor driver, such as depicted in FIG. 1. A tape cartridge 40 is detachably mounted in the tape drive 100. The tape of the tape cartridge 40 moves in the longitudinal direction accompanying rotation of the reel. The head 140 moves in the longitudinal direction of the tape to write data on the tape or read data from the tape. The tape cartridge 40 is equipped with a non-contact non-volatile memory called a cartridge memory (CM). The CM mounted in the tape cartridge 40 is subjected to non-contact read and write operations by the tape drive 100. The CM stores the cartridge attributes. At a time of reading or writing, the tape drive reads the cartridge attributes from the CM so that optimal read and write operations can be performed.

The control unit 150 performs overall control of the tape drive 100. That is, the control unit 150 controls writing of data to the tape medium 40 and reading of data from the tape medium 40 in accordance with a command received by the interface. The control unit 150 also controls the positioning unit 160 in accordance with a signal of a servo track that was read. In addition, the control unit 150 controls operations of the motor through the positioning unit 160 and the motor driver 170. Note that the motor driver 170 may also be connected directly to the control unit 150.

The tape drive 100 can also be utilized on a file system, similarly to a hard disk drive (HDD) or the like. For example, according to the LTFS, data that was written on a tape medium 40 can be presented as a file. In the tape drive, a tape medium 40 is divided into two or more partitions. Each partition is treated as if it was a single tape, and data can be selectively written on each partition. In a file system for a tape drive 100, for example, the LTFS, data that was written on a tape medium 40 can be presented as a file having corresponding index (metadata) information stored on the tape medium 40. The index includes, in relation to the data of the file, a path and a name of the file, and positional information and size information (extent) on the medium.

Figure 3A:
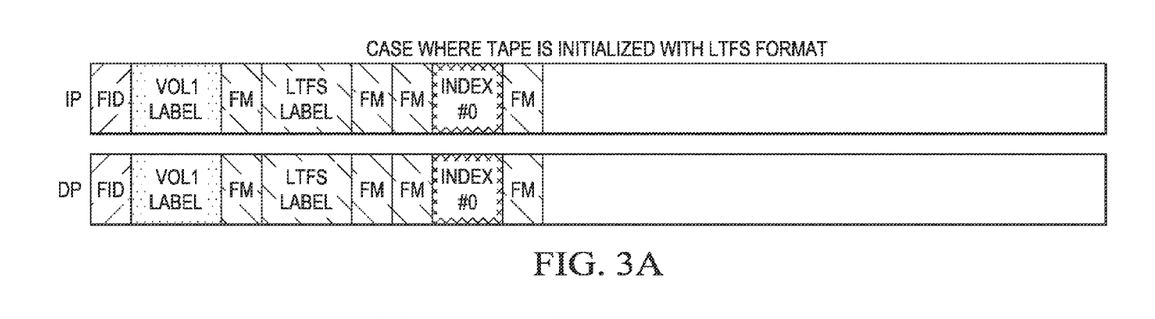
FIGS. 3A-3C are diagrams illustrating information that is stored in an IP and a DP of a tape according to the LTFS format.
Figure 3B:
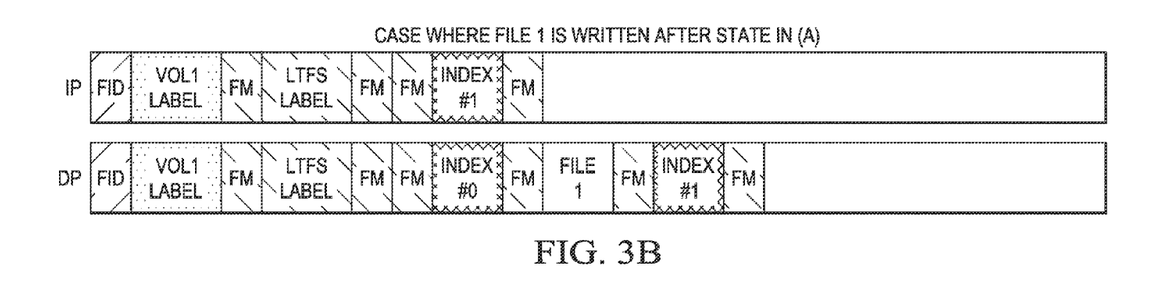
Figure 3C:
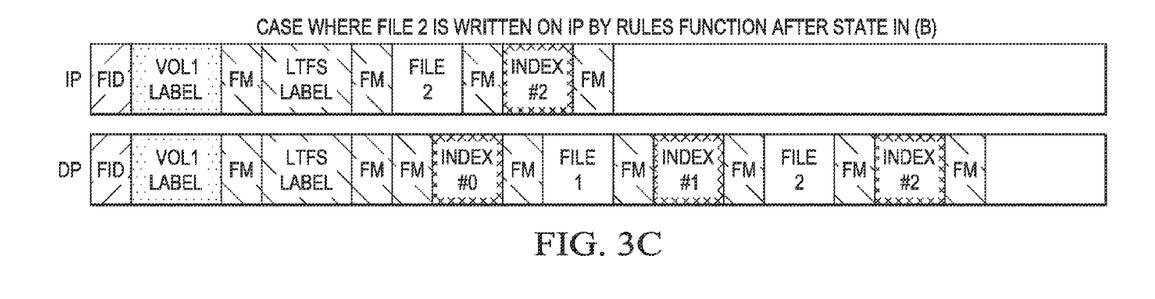

FIGS. 3A-3C are diagrams illustrating information that is stored in an index partition (IP) and a data partition (DP) of a tape medium according to the LTFS format. The information includes data of the file of a user and metadata (index) of the file. According to the LTFS, in order to write and read writing files on a tape medium, it is necessary to previously initialize the tape medium in the LTFS format. When using a tape medium according to the LTFS, the tape medium is divided into two partitions, namely an index partition (IP) and a data partition (DP), and then used. When a user utilizes the LTFS to write on a tape medium, in addition to writing the body of the file on the tape medium, meta-information that is called an "index file" (also referred to simply as "index") is written on the tape medium. The index holds information such as a file name and a file creation date. Primarily, only the latest index is written on the IP. The body of the file and the history of the index are written on the DP.

FIGS. 3A-3C show that a tape medium that is a single tape cartridge is divided into an index partition and a data partition. FIGS. 3A-3C illustrate a configuration example of a tape medium that is compatible with LTO-5. An example is shown in which the tape medium is divided in two into the IP and DP from a beginning of tape (BOT) to an end of tape (EOT). The tape medium is divided along a track that records data into the index partition at the BOT and the data partition that occupies a major part of the tape storage area. It is possible to change the number of partitions to an arbitrary number of three or more in accordance with various specifications.

FIG. 3A shows information that is written on the tape medium immediately after the tape medium is initialized in the LTFS format. Immediately after the tape medium is initialized in the LTFS format, the following information shown in FIG. 3A is written on the tape medium:

FID (Format Identification Data set) is special data that is written at the top of a tape medium when the tape drive initializes the tape medium, and holds information such as the number of partitions and the storage capacity of each partition on the tape medium.

VOL1 Label is also referred to as "ANSI Label", and as is literally described, is the label of a general format defined by ANSI.

LTFS Label is a label defined by the LTFS format, and is a label that holds information indicating which version of the LTFS format the tape medium has been formatted in conformity with. The size of a record to be recorded on the medium is indicated here. A record size is also referred to as a "block size". A record size is secured even in a case where the size to the end of the file is less than the record size (for example, 512 KB).

FM (Filemark) is information that is generally utilized with a tape medium and in a sense is similar to a bookmark, and is utilized when performing a data seek. Index #0 refers to an index that is written at the time of formatting, and although the index does not hold any unique file information since files themselves do not exist at this stage, the index is written to hold information such as a volume name of the tape medium. Two FMs are provided between the LTFS label and the index.

FIG. 3B shows information that is written on the tape medium when a single file is written after the tape medium was initialized according to the LTFS format. When a file (File 1) is written after initialization according to the LTFS format, the data that is written on the tape medium is written in the form illustrated in FIG. 3B. Index #1 holds information of File 1. The IP holds only the latest index, and the DP holds the index history. The timing at which to update the index is left to the implementation of the file system. For example, the index may be updated at fixed time periods, or may only be updated when taking the tape medium out from the tape drive. In a case where a tape medium is continued to be used further, the index that is placed in the IP is always the latest index only, and a file and an index are written by appending the data to the DP without overwriting an existing index.

FIG. 3C shows information relating to stored data in a case where a File 2 is written to the IP by the rules function after the state shown in FIG. 3B. When writing another file (File 2) to the IP by means of the rules function, an old index is overwritten to write the File 2 and an Index #2 that is the latest index. Only one index exists in the IP. The File 2 that is written on the IP is also written on the DP. The File 2 and the Index #2 are written by appending the relevant data to the DP of the tape medium following the File 1 that was written first.

Figure 4:
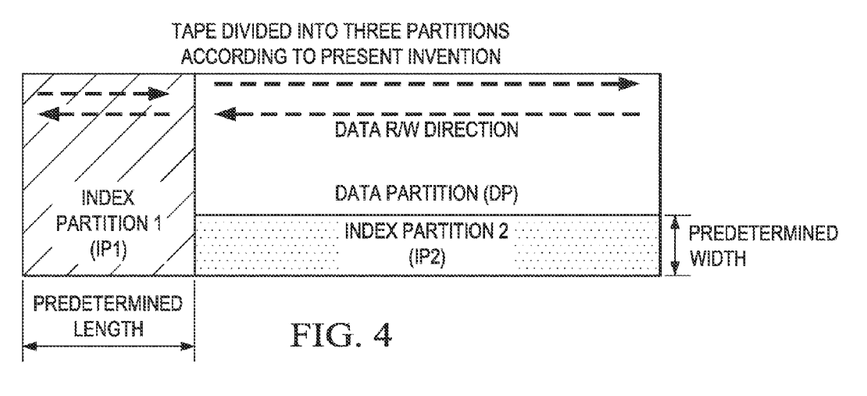
FIG. 4 is an example diagram illustrating an illustrative embodiment of the present invention that divides the IP region into two regions.

FIG. 4 is a diagram illustrating example illustrative embodiment of the present invention in which an IP region is divided into two regions. Although according to the conventional LTFS, a tape medium is divided into partitions in only the longitudinal direction, according to the present invention a tape medium (hereafter just "tape") is also divided in the transverse direction to thereby provide three partitions on the tape. A first region (IP1) of the index partition (IP) occupies a wrap region of a predetermined length at a BOT in the longitudinal direction of the tape. A second region (IP2) of the IP extends to the end of the tape (EOT) with a wrap that follows the first region in the longitudinal direction, and is a partial width in the transverse direction.

The IP1 can be accessed immediately after the tape is loaded (mounted), and is a beginning of the tape. Although there is thus the advantage that a seek operation does not take a long time, on the other hand there is the drawback that because the width in the longitudinal direction is narrow, wrap turns occur at frequent intervals. Consequently, the IP1 is not suitable for writing large-size data.

The IP2 occupies a region in the longitudinal direction in a similar manner to the conventional index partition. Therefore, in comparison to the IP1, the frequency of wrap turns is low, and the IP2 is suitable for writing long data. However, the conventional drawback that in some cases a seek operation takes a long time depending on the relationship between the top position of certain data and the header position on the tape still remains.

According to one illustrative embodiment of the present invention, an advantage is obtained that access time to metadata is shortened by having IPs at two places. In the present method, it is assumed that metadata is always written to the IP1. This is because a configuration is adopted so that metadata on the IP is read immediately after mounting and is written immediately prior to unmounting, and hence favorable efficiency is realized by placing the metadata at the beginning of the tape. As a result, metadata can be accessed in a short time at the time of mounting, without being affected by the amount of user data that is written by the rules function. Although there is the drawback that the frequency of wrap turns is high in the IP1, the data amount of metadata is rarely very large. It is considered that as long as the width in the longitudinal direction of the IP1 is not exceptionally narrow, wrap turns will not occur at a high frequency when reading. Further, since the metadata is processed while being expanded on the memory, when the initial access is fast, the start of processing can be speeded up by a corresponding amount. Even if there is a time lag to some extent after reading starts, the time lag is concealed by the time taken for internal processing of the LTFS and the influence of the time lag is minor.

According to one illustrative embodiment of the present invention, by providing an IP at two places, an advantage is obtained that the access time to user data can be shortened. With respect to user data specified by the rules function, the initial portion of the data is written to the IP1, and all of the data is written to the IP2. When reading, first the data of the IP1 that can be accessed without a seek operation is read. Subsequently, while transferring the data that was read to the host, the head is moved (located) to the data position of the IP2 and reads the remaining data from the IP2.

In order not to interrupt the transfer of data when moving from the IP1 to the IP2, a data amount that is written to the IP1 is adjusted depending on the position in the longitudinal direction of the data on the IP2. That is, the data amount that is written to the IP1 is increased in proportion to the distance to the data on the IP2.

Figure 5A:
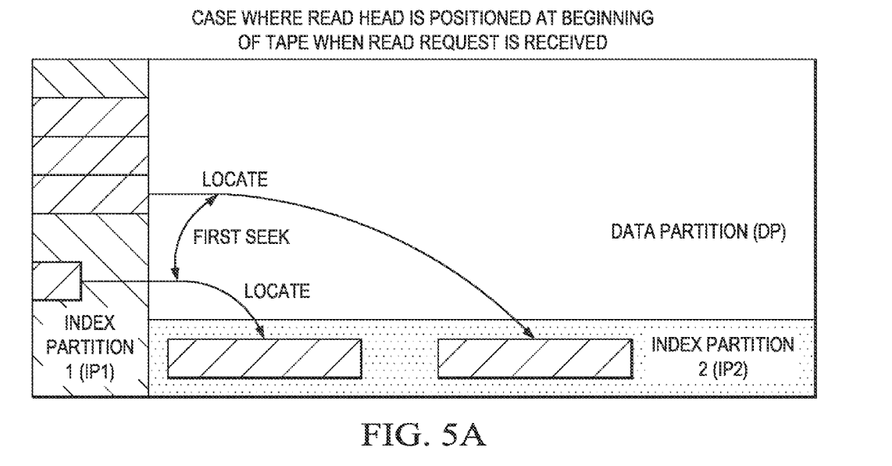
FIGS. 5A-5B are diagrams illustrating which seek selection results in less interruption of a data transfer with respect to a position of a head in an IP1 region or an IP2 region in a longitudinal direction of a medium in accordance with one illustrative embodiment.
Figure 5B:
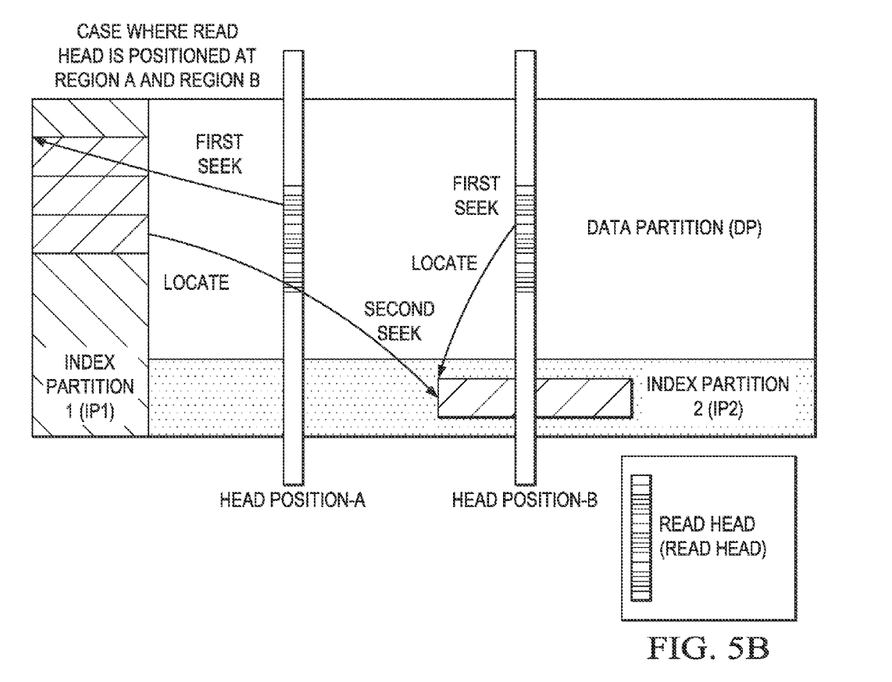

FIGS. 5A-5B are diagrams illustrating which seek selection results in less interruption of a data transfer with respect to a position of a head in an IP1 region or an IP2 region in a longitudinal direction of a medium in accordance with one illustrative embodiment. FIG. 5A is a diagram that illustrates that data of the file in the IP1 region is read in a case where a head is positioned in the vicinity of the IP1. The above described behavior is behavior in a case where the header of the tape drive is positioned at the beginning of the tape (BOT) when a read request is received.

At the time that the tape medium is mounted in the tape drive, because the read head is positioned at the beginning of the tape medium, almost no movement (locate) is required with respect to a seek time to the top data portion that is stored in the IP1. The top portion of a predetermined data amount of a file that is the read request target is transferred to the host while being read to the buffer. During this data transfer, a first seek is performed from the IP1 to the IP2, and the read head moves to the position of residual data of the stored file in the IP2. Transferring of the data of the top portion does not finish during the first seek time. Here, the residual data is the remaining data portion of the file that follows the data of the top portion. All data of the file that is the object of the read request is transferred as the result of the top data portion and the residual data portion being transferred in succession to the host.

When performing a read operation at a timing other than immediately after mounting, it is not necessarily the case that the header of the tape drive will be positioned in the vicinity of the beginning of the tape. Therefore, the occurrence of a first seek to move to the top of the data is unavoidable. However, according to the present illustrative embodiments, since data can be read from both of the IP1 and the IP2, a movement location for the head is determined based on the relationship between the data position and the header position in the two IPs at the time at which a read command is received. Typically, moving the head to the data position in the IP (IP1 or IP2) that is closest to the current position of the head can contribute to reducing the seek time.

FIG. 5B illustrates a situation in which data of a file in the IP2 region is read in a case where a head is positioned in the vicinity of the IP2. For example, in a case where a read-write head is in a region A at a position in the longitudinal direction of the tape at a time that a read command is received, the read-write head moves to the IP1 to perform a read operation according to the first seek. While reading out the top data portion of the IP1, the head moves to the position of the residual data stored in the IP2 according to the second seek. Top portion data of a sufficient amount is stored during the course of the second seek. In other words, the data amount stored in the IP1 of the file that is the target of the read request is a data transfer amount that exceeds the second seek time. At this time, a configuration may be adopted in which weights are assigned to facilitate selection of movement to the IP2 in consideration of the fact that moving to the IP2 is essential in the case of reading from the IP1 and that many wrap turns occur when reading at the IP1. In a case where the current position of the head is in a region B in the longitudinal direction, the head moves to the position of all the data stored in the IP2 according to the first seek.

Figure 6:
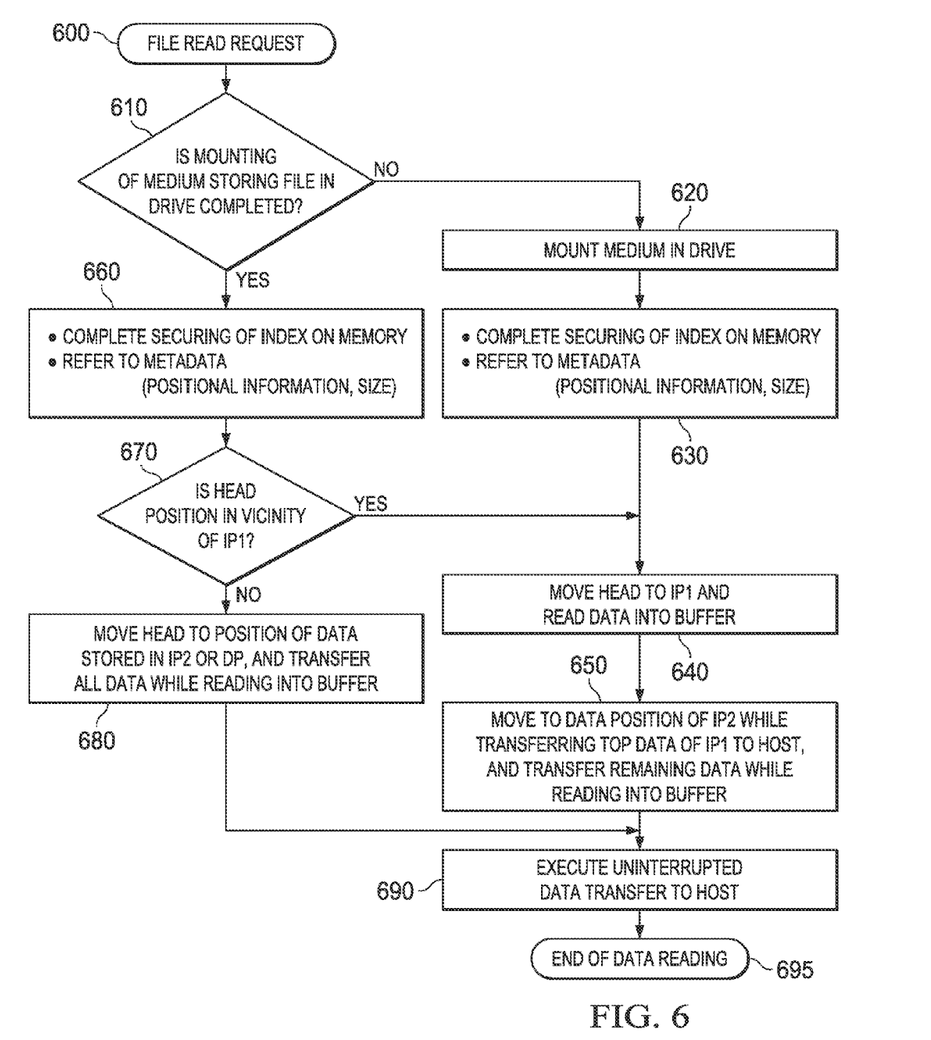
FIG. 6 is a diagram illustrating a flow of operations to read data that is written in IPs at two places (IP1 and IP2) in accordance with one illustrative embodiment.

FIG. 6 illustrates the flow of operations to read data that was written to the IP at two places (IP1 and IP2). The operations outlined in FIG. 6 will be described herein as follows:

(600): Receive a file read request.

The tape drive 100 receives a read request for data of a file stored in the IP from the host 300. Typically, recording and playback of video data can be assumed as an application example of the writing/reading of data from a tape medium in an illustrative embodiment of the present invention. In such a case, a high-resolution file is stored in the DP of the tape medium, and a low resolution file is stored by the rules function in the IP.

(610): Check if mounting of a tape medium storing the file for which reading was requested into the drive is completed. If the tape medium that is the target of the read request is mounted in the drive (Yes), the processing in step 660 is executed. If the tape medium is not mounted (No), the processing in step 620 is executed.

(620): Mount the tape medium storing the file to be read in the drive. Next, execute the processing in step 630.

(630), (660): When the target tape medium is mounted in the drive, loading of the index (metadata) of the tape medium on the main memory is completed by the drive or the host. Therefore, the drive is in a state in which metadata (positional information, size and the like) of the file can be acquired from the main memory. If step 630 is performed, the processing in step 640 is executed next. If step 660 is performed, the processing in step 670 is executed next.

(640): The head moves to the IP1 region and reads data to the buffer. This movement is performed to read a data portion at the top of the file in the IP1 as the closest place at which data of the file is stored. The data of the top portion is stored in the data buffer of the drive, and is immediately transferred to the host. Next, the processing in step 650 is executed.

(650): Move to the data position of IP2 during transfer of top data of IP1 to host, and read remaining data of the file into the buffer. The data is written in a manner in which the data is broken up between a data at the top (in the IP1) of the read file and the remaining data (in the IP2) that follows the top data portion. Note that when taking into consideration a case where all the data is read in step 680, data is written so as to store all the data of the read file in the IP2. The data position and size of the top data portion of the target file that is stored in the IP1 and the subsequent data thereof that is stored in the IP2 can be identified by the metadata secured in step 630. Next, the processing in step 690 is executed.

(670): Check if head position is in vicinity of tape IP1. A part or all of the data of the file that is the read target is stored in both of the IP1 and the IP2 in the longitudinal direction of the tape. An operation to check the position of the read-write head 140 (FIG. 2) is performed to determine whether reading and data transfer will be speeded up more by moving the read-write head 140 (FIG. 2) to IP1 or to IP2. More specifically, referring to FIG. 5B, the movement destination of the head is determined depending on whether the head is at position A or position B in the longitudinal direction of the tape. For example, if the current position of the head is position A (Yes), the head is moved by a first seek to the position of the top data of the IP1 as an operation that can speed up reading of the top data of the IP1 (step 640). Next, the head is moved as far as the subsequent data by a second seek and reads out the data into the buffer (step 650). In contrast, if the current position of the head is in the region of position B (No), the head is moved by the seek to the position of all the data stored in the IP2 that stores all the data, and reads all the data into the buffer (step 680). Note that, with respect to the file that is the read target, the top data portion stored in the IP1 and the metadata of all the data stored in the IP2 and DP are included in the index. The position and size of the respective data items can be confirmed by extent information included in the index. Further, the read-write control unit 150 (FIG. 2) ascertains the current position of the head.

(680): The head moves to the closer position thereto among the respective data storage positions of the IP2 and the DP, and reads all data into the buffer. Next, the processing in 690 is executed.

(690), (695): Uninterrupted data transfer to the host is executed, and data reading ends. Thus, according to the writing and reading method of the illustrative embodiments of the present invention, it is possible to quickly send an image file to the host and also transfer uninterrupted video data in accordance with the current position of the head in the longitudinal direction of the medium and the request to read a file.

An example of approximately calculating the predetermined length of the IP1 (see FIG. 4) will now be described. The predetermined length of the IP1 determines what amount of data can be stored in the IP1 as data of the top portion. That is, the predetermined length of the IP1 is defined so that transfer of the top data does not end even in the course of a seek movement to a position of the IP2 that stores the subsequent data. The advantages of the present method are exhibited particularly in the case of a tape with respect to which the possibility that user data written in the IP will be read immediately after mounting is high.

An example is described below. A case is considered hereunder in which a high resolution video file such as a movie is written to the DP, and a low resolution version of the video file (hereunder, referred to as "low resolution file") is written to the IP. When it is desired to confirm in a short time what video has been written on the tape, the user accesses the low resolution file on the IP. According to the conventional method, a seek in the longitudinal direction occurs in order to access metadata or user data (a low resolution file) on the IP, and it takes time until the data is read.

In contrast, according to the proposed mechanisms of the illustrative embodiments, since metadata and the beginning of the low resolution file are written on the IP1, reading of the file can start in a short time. Further, after reading of the low resolution file starts, reading can be continued without playback of the video being interrupted. Here, the amount of data required on the IP1 in order to continue reading data without interrupting playback of a video is calculated. However, this calculation is a rough estimation that is made to output an approximate figure, and strictly speaking it is necessary to take into consideration the data compression ratio and acceleration and deceleration of the tape and the like.

In an LTO-5 tape drive, the tape running speed at the time of a seek is 10 m/sec. Further, the length in the longitudinal direction of an LTO-5 tape is approximately 800 m. Hence, in a case where data on the IP2 is positioned at the end of the tape, the required time for a seek from the top of the tape is approximately 80 seconds. Here, it is assumed that the bit rate of a low resolution file is X (Mbps). The byte rate thereof is X/8 (MB/sec). To gain a seek time of 80 seconds at this bit rate, it is necessary to store data of (X/8)×80=10X (MB) in advance. Since the maximum transfer rate of the LTO-5 tape drive is 140 (MB/sec), the amount of data that can be stored per second is (140−X/8) (MB), and therefore 10X/(140−X/8) seconds is required to store 10X (MB). Hence, the amount of data it is necessary to write in the IP1 is [10X/(140−X/8)]× 140 (MB).

As an example with respect to a low resolution file, in a case where a video that is equivalent to a VHS video is assumed, the bit rate is approximately 2 (Mbps). When this value is applied to the above formula, the amount of data it is necessary to write in the IP1 is 20.03 (MB). This is a data amount that is small enough to fit in the buffer of the tape drive, and therefore it is not necessary to use an external HDD to store the data of the IP1 and this data amount can be handled using only the drive.

A data amount of 20 MB is equivalent to approximately 80 cm of tape with respect to an LTO-5 tape. Hence, by setting the length in the longitudinal direction of the IP1 to a length that is a little longer than 80 cm, two or more wrap turns will not occur during reading of data on the IP1. Since, as described above, the running speed at a time of movement of the tape is 10 msec, the time required to move 80 cm is 0.08 sec.

For example, even if the data it is desired to read immediately after mounting the tape is at the end of the IP1, the time taken to move to that position is short enough to be ignorable. Further, with respect to metadata that is read at the time of mounting, there are few cases where the data amount thereof exceeds 20 MB, and thus it can be said that a length of 80 cm is also an adequate length for suppressing frequent occurrence of wrap turns when reading metadata at the time of mounting.

As described above, according to the conventional method, in particular, a seek occurs in the longitudinal direction in order to access metadata or user data (a low resolution file) on the IP, and it takes time until the data is read. In contrast, according to the present invention, reading of a file can be started in a short time by applying the present invention as described above. Further, by applying the mechanisms and methodology of the illustrative embodiments of the present invention, playback of a video can be continued without interruption after reading of a file starts also.

While the present invention has been described above using an embodiment, the technical scope of the present invention is not limited to that of the above described embodiment. It will be apparent to those skilled in the art that various changes and substitutions can be made without departing from the spirit and scope of the present invention.

The invention claimed is:

1. A method for writing data of a file on a medium in a tape drive in a manner that enables high-speed reading of the file that is stored, the method comprising:

applying a predetermined format to the medium that divides the medium into a first region of a predetermined length in a longitudinal direction from a beginning region of the medium, a second region that extends from an end of the first region to a terminal region of the medium in a longitudinal direction and that has a predetermined width with respect to a width of the medium in a transverse direction, and a third region that extends from the end of the first region to the terminal region of the medium in the longitudinal directed and that extends from a beginning of the second region in the transverse direction to an opposite edge of the medium, wherein the predetermined format includes an index partition (IP) that stores an index of the file and a data partition (DP) that stores data of the file wherein the IP includes the first region (IP1) and the second region (IP2), wherein the DP includes the third region; and writing a top data portion of a predetermined data amount of the data of the file in the first region, writing data of the file in the second region, writing data of the file in the third region, wherein the too data portion of the predetermined data amount of the file is written on the IP1, wherein the data of the file is written on the IP2, wherein the data of the file is written on the DP, wherein the index includes metadata of data portions of the file stored in the DP, the IP1, and the IP2, and wherein the metadata includes positional information of the data portions stored in the DP, the IP1, and the IP2, respectively.

2. The method according to claim 1, wherein the predetermined data amount is determined according to a movement time from a position of the top data portion stored in the IP1 to a position of residual data of data of the file stored in the IP2 portion when reading the file.

3. The method according to claim 2, wherein the predetermined length is determined so that the top data portion of the predetermined data amount stored in IP1 and the following residual data portion stored in IP2 can be read without interruption.

4. The method according to claim 3, wherein the predetermined length is determined with a maximum seek time from the IP1 to the IP2 on a basis that all the data stored in the IP2 is positioned at a terminal region of the medium.

5. The method according to claim 1, further comprising, in response to a request to read the file being received:

identifying a current position of a read-write head in a longitudinal direction of the medium;

determining whether the current position of the head is closer to a position of the top data portion that is stored on the first region that records the file or a position of the data stored on the second region; and moving the determined position of the head to the data position that is closer thereto, and starting reading from the data.

6. The method according to claim 5, wherein, in a case of determining the current position of the read-write head immediately after mounting the medium, the current position of the read-write head is determined as being close to a position of the top data of the IP1.

7. The method according to claim 5, wherein, in the reading operation, if the current position of the head is close to a position of the IP1, based on positional information for each data portion included in the index, the head is moved to the top data portion of the medium and moved to the position of residual data among the data of the IP2 that follows the top data portion and reads the data.

8. The method according to claim 5, wherein, in the reading operation, if the current position of the head is close to the position of the IP2, the head is moved to the position of all data on the IP2 and reads the data.

9. A tape drive that writes data of a file on a medium in a manner that enables high-speed reading of the file that is stored, wherein write control of the drive executes:
application of a predetermined format to the medium that divides the medium into a first region of a predetermined length in a longitudinal direction from a beginning region of the medium, a second region that extends from an end of the first region to a terminal region of the medium in a longitudinal direction and that has a predetermined width with respect to a width of the medium in a transverse direction, and a third region that extends from the end of the first region to the terminal region of the medium in the longitudinal directed and that extends from a beginning of the second region in the transverse direction to an opposite edge of the medium, wherein the predetermined format includes an index partition (IP) that stores an index of the file and a data partition (DP) that stores data of the file, wherein the IP includes the first region (IP1) and the second region (IP2), wherein the DP includes the third region; and
writing of a top data portion of a predetermined data amount of the data of the file in the first region, writing of data of the file in the second region, writing data of the file in the third region wherein the too data portion of the predetermined data amount of the file is written on the IP1, wherein the data of the file is written on the IP2, wherein the data of the file is written on the DP, wherein the index includes metadata of data portions of the file stored in the DP, the IP1, and the IP2, and wherein the metadata includes Positional information of the data portions stored in the DP, the IP1, and the IP2 respectively.

10. The tape drive according to claim 9, wherein read control of the tape drive executes, in response to receiving a request to read the file:
identification of a current position of a read-write head in a longitudinal direction of the medium;
a determination as to whether the current position of the head is closer to a position of a top data portion that is stored on the first region that records the file or a position of the data stored on the second region; and
movement of the determined position of the head to the data position that is closer thereto, and starting of reading from the data.

11. A computer program product in a non-transitory computer readable medium for a tape drive that writes data of a file on a medium in a manner that enables high-speed reading of the file that is stored, wherein the program product causes the tape drive to execute:
application of a predetermined format to the medium that divides the medium into a first region of a predetermined length in a longitudinal direction from a beginning region of the medium, a second region that extends from an end of the first region to a terminal region of the medium in a longitudinal direction and that has a predetermined width with respect to a width of the medium in a transverse direction, and a third region that extends from the end of the first region to the terminal region of the medium in the longitudinal directed and that extends from a beginning of the second region in the transverse direction to an opposite edge of the medium, wherein the predetermined format includes an index partition (IP) that stores an index of the file and a data partition (DP) that stores data of the file, wherein the IP includes the first region (IP1) and the second region (IP2), wherein the DP includes the third region; and
writing of a top data portion of a predetermined data amount of the data of the file in the first region, writing of data of the file in the second region, writing data of the file in the third region, wherein the top data portion of the predetermined data amount of the file is written on the IP1, wherein the data of the file is written on the IP2, wherein the data of the file is written on the DP, wherein the index includes metadata of data portions of the file stored in the DP, the IP1, and the IP2, and wherein the metadata includes positional information of the data portions stored in the DP, the IP1, and the IP2, respectively.

12. The computer program product according to claim 11, wherein the computer program product causes the tape drive, in response to receiving a request to read the file, to execute:
identification of a current position of a read-write head in a longitudinal direction of the medium;
a determination as to whether the current position of the head is closer to a position of the top data portion that is stored on the first region that records the file or a position of the data stored on the second region; and
movement of the determined position of the head to the data position that is closer thereto, and starting of reading from the data.

13. The tape drive according to claim 9, wherein the predetermined data amount is determined according to a movement time from a position of the top data portion stored in the IP1 to a position of residual data of data of the file stored in the IP2 portion when reading the file.

14. The tape drive according to claim 13, wherein the predetermined length is determined so that the top data portion of the predetermined data amount stored in IP1 and the following residual data portion stored in IP2 can be read without interruption.

15. The tape drive according to claim 14, wherein the predetermined length is determined with a maximum seek time from the IP1 to the IP2 on a basis that all the data stored in the IP2 is positioned at a terminal region of the medium.

16. The computer program product according to claim 11, wherein the predetermined data amount is determined according to a movement time from a position of the top data portion stored in the IP1 to a position of residual data of data of the file stored in the IP2 portion when reading the file.

17. The computer program product according to claim 16, wherein the predetermined length is determined so that the top data portion of the predetermined data amount stored in IP1 and the following residual data portion stored in IP2 can be read without interruption, and wherein the predetermined length is determined with a maximum seek time from the IP1 to the IP2 on a basis that all the data stored in the IP2 is positioned at a terminal region of the medium.

* * * * *